(12) United States Patent
Spagnolini et al.

(10) Patent No.: US 9,107,203 B2
(45) Date of Patent: Aug. 11, 2015

(54) EQUIPMENT FOR FEMTOCELL TELECOMMUNICATIONS SYSTEM

(75) Inventors: Umberto Spagnolini, Lissone (IT); Jonathan Gambini, Monza (IT); Mauro Arigossi, Lissone (IT)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 224 days.

(21) Appl. No.: 13/581,047

(22) PCT Filed: Feb. 24, 2011

(86) PCT No.: PCT/EP2011/052734
§ 371 (c)(1),
(2), (4) Date: Oct. 12, 2012

(87) PCT Pub. No.: WO2011/104299
PCT Pub. Date: Sep. 1, 2011

(65) Prior Publication Data
US 2013/0136038 A1    May 30, 2013

(30) Foreign Application Priority Data

Feb. 25, 2010   (IT) .............................. MI2010A0310

(51) Int. Cl.
| H04J 3/00 | (2006.01) |
| H04W 72/04 | (2009.01) |
| H04W 84/04 | (2009.01) |
| H04L 5/14 | (2006.01) |

(52) U.S. Cl.
CPC ............. *H04W 72/0406* (2013.01); *H04L 5/14* (2013.01); *H04W 84/045* (2013.01)

(58) Field of Classification Search
None
See application file for complete search history.

(56) References Cited

U.S. PATENT DOCUMENTS

| 5,870,392 | A | 2/1999 | Ann | |
| 6,864,834 | B2* | 3/2005 | Walton | 342/195 |
| 7,123,648 | B2* | 10/2006 | Ogawa | 375/211 |
| 2002/0052188 | A1 | 5/2002 | Behbahani | |
| 2002/0103012 | A1 | 8/2002 | Kim et al. | |
| 2004/0213170 | A1* | 10/2004 | Bremer | 370/282 |
| 2007/0097939 | A1 | 5/2007 | Nylander et al. | |
| 2009/0180438 | A1* | 7/2009 | Mazawa et al. | 370/331 |

(Continued)

FOREIGN PATENT DOCUMENTS

| EP | 0938241 A2 | 8/1999 |
| GB | 2459107 | 10/2009 |

(Continued)

*Primary Examiner* — Kibrom T Hailu
(74) *Attorney, Agent, or Firm* — Thorpe North & Western LLP (57) ABSTRACT

A femtocell telecommunication system equipment comprising: a base apparatus structured to provide a first information signal and control signals; an electrical conductor based transmission line connected to said base apparatus; a bidirectional conversion apparatus adapted to receive/transmit from/on the transmission line the first signal and the control signals; the bidirectional apparatus comprising: a processing module structured to process the first signal to generate a second information signal and vice-versa; the second signal being adapted to be transmitted/received by an antenna device connectable to the bidirectional apparatus.

20 Claims, 4 Drawing Sheets

(56) References Cited

U.S. PATENT DOCUMENTS

| | | |
|---|---|---|
| 2009/0264125 A1 | 10/2009 | Rofougaran |
| 2009/0296641 A1 | 12/2009 | Bienas et al. |
| 2009/0305671 A1 | 12/2009 | Luft et al. |
| 2009/0307540 A1* | 12/2009 | Razazian et al. ............ 714/701 |
| 2009/0316649 A1 | 12/2009 | Chen |
| 2010/0099366 A1* | 4/2010 | Sugar et al. .................. 455/75 |
| 2011/0170476 A1* | 7/2011 | Shapira et al. ............... 370/328 |

FOREIGN PATENT DOCUMENTS

| | | |
|---|---|---|
| WO | WO 2004/051804 | 6/2004 |
| WO | WO2005/120101 | 12/2005 |
| WO | WO2009/053710 | 4/2009 |
| WO | WO 2009/155602 | 12/2009 |

* cited by examiner

EQUIPMENT FOR FEMTOCELL TELECOMMUNICATIONS SYSTEM

TECHNICAL FIELD

The present description relates to wireless telecommunications systems and, particularly, to femtocell systems as a well known cellular system with small cell size.

TECHNICAL BACKGROUND

The very high data rates envisioned for the 4G wireless systems in reasonably large areas do not appear to be feasible with the conventional cellular architecture due the spectrum usage above the 2 GHz band, where in-building radio penetration is heavily penalized.

The foreseen solution could be that of improving coverage by increasing the density of base-stations. However, this solution would be feasible only if costs incurred by network expansion could be counterbalanced by a proportional growth of new subscribers. This seems unlikely, being the penetration of cellular phones already high in developed countries.

Figure 1:
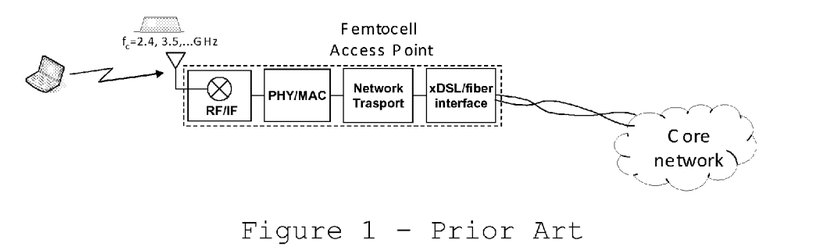
FIG. 1 refers to a conventional femtocell system.

Some technologies concerned with distributing the radio frequency (RF) signal of wireless communication standards through pre-installed cable connections have recently gained attention. One example is femtocell technology. FIG. 1 shows a conventional femtocell system. The basic idea of femtocells lies in providing in-house base stations (or Femtocell access points) connected with the operator's core network through broadband backhauling cables (twisted pairs, coaxial cables and optical fibers).

Femtocell access points (FAPs) are envisioned to provide radio coverage for any cellular protocol (GSM/UMTS, WiMAX and HSPA/LTE) on the air interface, and to use broadband connections such as optical fiber or digital subscriber lines (xDSL) as back-hauling. Compared to other techniques for increasing system capacity, the key advantages of femtocells are the reduced deployment cost for the service provider, and the increased indoor coverage (namely for spectrum allocation beyond 2 GHz). However, the femtocell paradigm unavoidably leads to face with several (still) open issues such as synchronization (especially if using Orthogonal Frequency Division Multiple Access—OFDMA—as access method), security, interference and mobility management. All these issues could be more efficiently handled by a centralized approach rather than by employing dislocated and likely uncoordinated FAPs.

U.S. Pat. No. 6,014,546 tackles the issue of in-building distribution of a RF wireless signal over commonly pre-installed low-bandwidth infrastructure, and discloses a method for the distribution of the reference synchronization signal to tune the local oscillators for frequency conversion of the wireless signal.

The Applicants observe that the prior art apparatuses for distributing wireless signals over cable infrastructures do not account for any reconfigurability issues as a necessary requirement when dealing with the multitude of cellular protocols that are currently coexisting over the air interface.

SUMMARY

An embodiment is described by the enclosed independent claim 1. Further embodiments are defined by the appended dependent claims 2-12.

BRIEF DESCRIPTION OF THE DRAWINGS

Further characteristics and advantages will be more apparent from the following description of preferred embodiment and of its alternatives given as a way of an example with reference to the enclosed drawings in which.

DETAILED DESCRIPTION OF EMBODIMENTS

Figure 2:
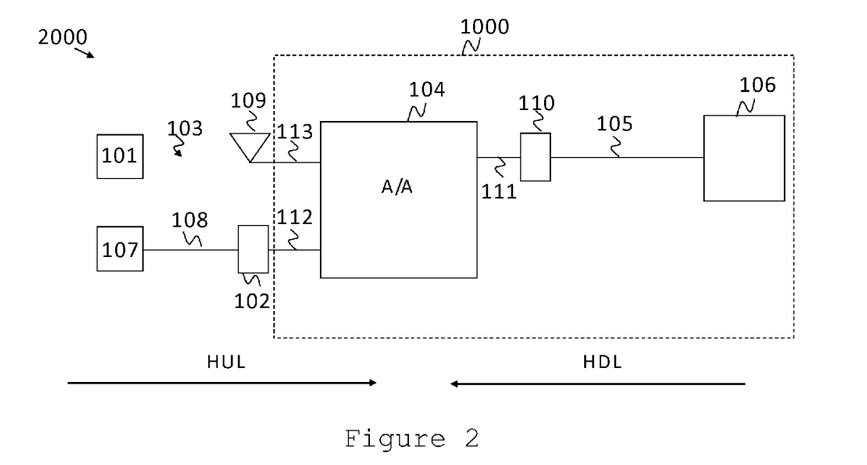
FIG. 2 shows schematically an embodiment of a femtocell telecommunication system portion including a bidirectional conversion apparatus and a remote base apparatus.

FIG. 2 shows an embodiment of a femtocell telecommunication system portion 2000 including an equipment 1000 comprising a bidirectional conversion apparatus 104 and a remote base apparatus 106.

According to one preferred embodiment, the bidirectional conversion apparatus 104 may be deployed so as to provide radio coverage to a circumscribed area (such as a home or an office environment), and the remote base apparatus 106 is deployed at a remote location with respect to said bidirectional conversion apparatus 104. The bidirectional conversion apparatus 104 is separated from and external to the remote base apparatus 106.

According to the example shown in FIG. 2 the bidirectional conversion apparatus 104 is connected by means of a high bandwidth connection 113 to a unit 109 for interfacing with a high bandwidth connection 103. Particularly, the high bandwidth connection 103 is the radio environment and the unit 109 is a radiation antenna device for appropriate radio propagation.

Through the antenna device 109, the bidirectional conversion apparatus 104 can intercept signals at high frequency $f_H$ incoming from at least one high frequency user 101 and, conversely, can transmit signals at high frequency $f_H$ to the user 101 employing high frequency communication. The user 101 using high frequency link is a wireless device such as a mobile terminal (e.g. a cellular telephone, a personal computer provided with a wireless card, an interactive multimedia terminal for audio and/or video services, and any nomadic or mobile device that establishes a bidirectional wireless connection with a core network for data or voice communication), employing one of the wireless standards that support femtocell telecommunications.

According to a specific embodiment, the bidirectional conversion apparatus 104 could be also connected, by a connection 112, to an interfacing unit 102 which allows communications with a secondary user device 107, through a wired medium 108. The secondary user device 107 is a device employing any broadband subscriber line standard, such as ADSL, VDSL, ISDN, SDSL, HDSL and like, and the medium 108 is, as an example, a 10base T Ethernet cable or, in some cases, an universal serial bus (USB) line.

The bidirectional conversion apparatus 104 is also connected via a connection 111 to an interfacing unit 110 which is adapted to interface with a low frequency medium 105. The low frequency medium 105 can be an electrical conductor based transmission line.

An electrical conductor based transmission line comprises: twisted pair, coaxial cable, transmission line employing power line or any other arbitrary system including electrical conductors. Particularly, the electrical conductor based transmission line can be a telephone line. In the following description reference is made to the exemplary case of a twisted pair telephone line 105. Moreover, the low frequency medium 105 can be a standard cable system belonging to common in-building cable infrastructure.

Particularly, the interfacing unit 110 can be, as an example, a conventional connector to the telephone line with electrical compatible interface.

Through interfacing unit 110, the bidirectional conversion apparatus 104 can intercept the signal at low frequency $f_L$ incoming from the remote base apparatus 106 and, conversely, can transmit the signal at low frequency $f_L$ to remote base apparatus 106.

Bidirectional connection to/from the remote base apparatus 106 over electrical conductor based transmission line 105 uses frequency spectrum around $f_L$ that is lower than high frequency $f_H$ employed for communications to/from the high frequency user 101 over the radio environment 103. However, frequency allocation (usually referred to as bandwidth) of signals over the electrical conductor based transmission line 105 or the radio environment 103 could be either overlapped or disjointed, or any combination.

Two different signal directions with respect to the high frequency user 101 *e* can be defined: the high frequency uplink (HUL) path, from connection 113 to connection 111, and the high frequency downlink (HDL) path from connection 111 to connection 113.

In accordance with the described example, in the HDL path, the bidirectional conversion apparatus 104 is in charge of up-converting the signal from frequency $f_L$ to frequency $f_H$, while in the HUL path the bidirectional conversion apparatus 104 is devoted to down-conversion the signal from frequency $f_H$ to frequency $f_L$.

The remote base apparatus 106 is located, as an example, in a telephone company central office, and the distance between the bidirectional conversion apparatus 104 and the remote base apparatus 106 indicatively ranges from 10 m to 1 km or even above.

The femtocell telecommunication system of FIG. 2 can comprise a plurality of bidirectional conversion apparatuses analogous to the bidirectional conversion apparatus 104. The plurality of bidirectional conversion apparatuses 104 can be remotely connected to the same remote base apparatus 106 (that acts as one-to-many control system) by means of respective electrical conductor based transmission lines analogous to the electrical conductor based transmission line 105 above described. According to an embodiment, each bidirectional conversion apparatus of said plurality is independently operated from the other bidirectional conversion apparatuses, and particularly, each bidirectional conversion apparatus is controlled by respective control signals independent from the control signals controlling the other bidirectional conversion apparatuses.

Moreover, the remote base apparatus 106 is adapted to support femtocell telecommunication technology and can include the functional modules for performing the required transmitting/receiving operations to/from the at least one high frequency user 101 and network management tasks as the ones normally included in conventional femtocell access points as in FIG. 1. All these operations allow also the direct connection with a core network. These functionalities can be specified as: (i) the conventional baseband processing such as modulation/demodulation and coding/decoding, in addition packet formatting, of the low frequency signal transmitted/received to/from the at least one bidirectional conversion apparatus 104; (ii) generation of appropriate control signals to be sent/or received to/from the at least one bidirectional conversion apparatus 104; (iii) medium access control and radio resource management, all these functionalities being referred to as PHY/MAC blocks, radio access bearing (e.g., with reference to UMTS network), service and network access control, mobility management and security tasks related to the communication of the at least one high frequency user 101.

Moreover, the remote base apparatus 106 is configured to be adapted to send/receive data and/or signalling information to/from other network entities (such as the radio network controller, said RNC, in the peculiar and not limiting case of UMTS radio access network). The remote base apparatus 106 performs all the functions of multiple conventional FAPs described above except the interfacing over high frequency medium 103 that is replaced by the bidirectional conversion apparatus 104. The remote base apparatus 106 will be denoted hereinafter as "remote unit 106".

Figure 3:
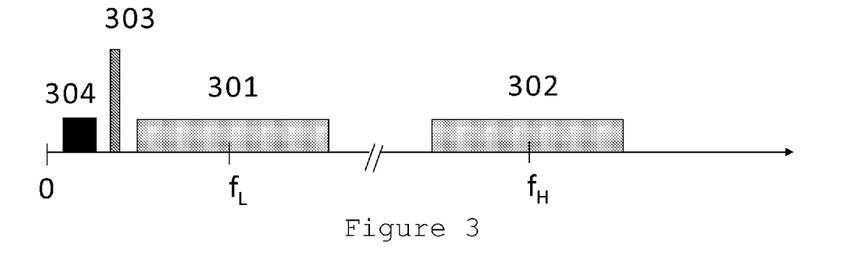
FIG. 3 shows examples of power spectra of signals employed by the system of FIG. 2.

FIG. 3 shows schematically an example of a spectrum of a low frequency signal 301 at frequency $f_L$ to be propagated on the low frequency medium 105, and the spectrum of a high frequency signal 302 at frequency $f_H$ to be received/transmitted at/towards the antenna device 109. The low frequency signal 301 is below the high frequency signal 302. In accordance with the example shown in FIG. 3, both bidirectional signals over low frequency and high frequency have the same bandwidth as one is the spectrally translated version of the other, but they are not necessarily present simultaneously.

The bidirectional conversion apparatus 104 is controlled by the remote unit 106 by means of a control signal transmitted on the electrical conductor based transmission line 105. Control signal 304 (FIG. 3) may be superimposed to the bandwidth of the low bandwidth signal 301 or may occupy a different spectral allocation as indicated in FIG. 3. Control signal 304 contains signalling information for setting the physical parameters of the bidirectional conversion apparatus 104 that needs not to be forwarded to connection 113 towards the high frequency user 101. Particularly, the control signal 304 can carry at least one or more of the following control information:

A1) power spectrum mask at the output of the antenna device 109 (towards high frequency medium 103), according to the employed high frequency standard protocol;

A2) power spectrum mask at the output of unit 110 (towards low frequency medium 105), according to the employed low frequency standard protocol;

A3) duplexing mode configuration (time division duplex or frequency division duplex) required by the employed high frequency standard protocol;

A4) allocated bandwidth both in HUL and HDL paths.

The control signal 304 can also report to the remote unit 106 some basic information on diagnostic of the bidirectional conversion apparatus 104.

The allocated bandwidth is primarily imposed by the employed high frequency and low frequency standards, and can be secondarily defined by some adaptive frequency allocation algorithm executed by the remote unit 106, if this is allowed (e.g., by the high frequency protocol).

Remote unit 106 can also distribute to the bidirectional conversion apparatus 104 a reference timing signal 303 (FIG. 3), which is used to synthesize the frequencies required for up-conversion and down-conversion.

Figure 4:
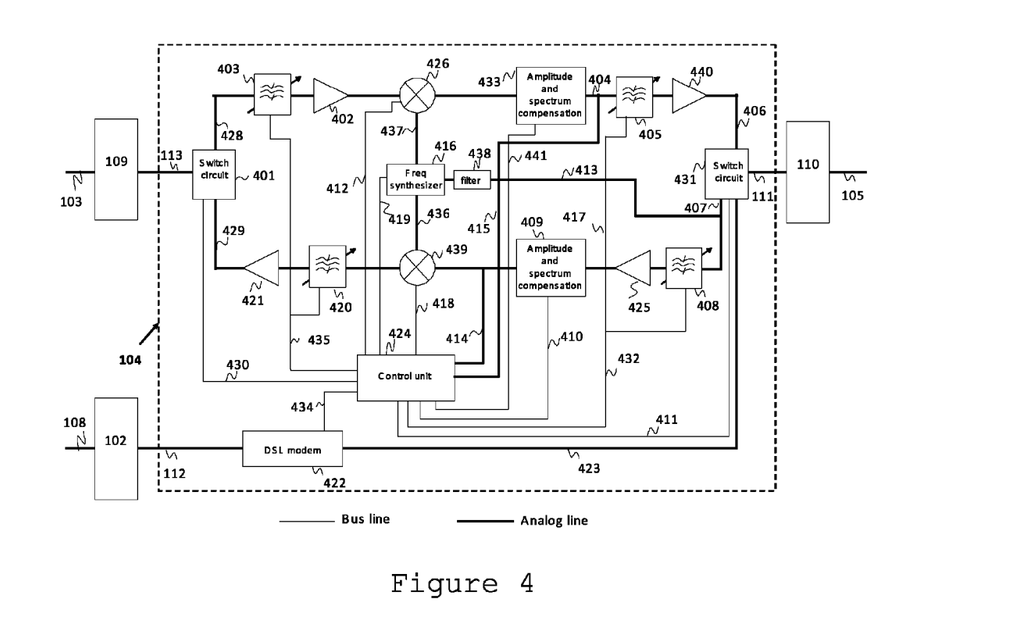
FIG. 4 shows a particular embodiment of said bidirectional conversion apparatus.

In accordance with up-to-date needs for flexibility both from end users and operators, the apparatus 104 can be also provided with a DSL modem 422 to be used to communicate with secondary user 107. The digital DSL modem can be designed for any broadband subscriber standard such as ADSL, VDSL, ISDN, SDLS, HDSL and like. Communication between secondary user 107 and the remote unit 106 can occur simultaneously or alternatively with the communication between the high frequency user 101 and said remote unit 106.

According to the preferred embodiment, high frequency $f_H$ is a radio frequency (RF) selected among the radio frequencies prescribed by the wireless and femtocell standards. As an example, high frequency $f_H$ can be 2.5 GHz or 3.5 if IEEE 802.16e-2005 (WiMAX Mobile) standard is employed as for wireless standard. Accordingly, the bandwidth at high frequency is a RF bandwidth selected from a group of RF bandwidths used for wireless and cellular communications (as an example, 10 MHz or 20 MHz). Connection 113, e.g., a coaxial cable, interfaces the wireless signal at the antenna 109 from/to the bidirectional conversion apparatus 104.

In accordance with the example of FIG. 2, the bidirectional conversion apparatus 104 is an adapter that interfaces the radio frequency (RF) spectrum and power allocation of the wireless signal incoming from the mobile user 101 to the low frequency spectrum and power allocation on the electrical conductor based transmission line 105. Dually, the bidirectional conversion apparatus 104 interfaces the low frequency spectrum and power allocation of signal from the remote unit 106 over electrical conductor based transmission line 105 to the radio frequency (RF) spectrum and power allocation of the wireless signal to the mobile user 101. Low frequency $f_L$ is selected according to the available transmission line 105 and can be, as an example, around 5 MHz in the particular and not limiting case where transmission line 105 is a twisted pair telephone line.

The bidirectional apparatus conversion 104 operates as an analog-to-analog converter which provides to translate analog signals (by up or down conversion) according to the specific radio protocol and cable connection, power levels are adjusted on both sides according to the specifications over the two links. It is observed again that the low frequency signal 301 and high frequency signal 302 have the same bandwidth as one is the spectrally translated version of the other (with proper spectral gain correction).

It is observed that the bidirectional conversion apparatus 104 for frequency conversion is remotely controlled by the remote unit 106 so as to accomplish the requirements imposed by different high frequency (wireless) and low frequency (cable) standards. Moreover, according to the described embodiment, the bidirectional conversion apparatus 104 can be remotely and dynamically configured to accomplish different specifications of air/cable standards in terms of spectral mask, power level and frequency allocation.

A particular embodiment of the bidirectional conversion apparatus 104 is shown in FIG. 4. A description of the structure and operation of the bidirectional conversion apparatus of FIG. 4 is provided hereinafter with reference the HDL path.

High Frequency Downlink (HDL) Path

With reference to FIG. 4 and FIG. 3, the low bandwidth signal 301 incoming by remote unit 106 via the low frequency medium 105 is driven by interfacing unit 110 through connection 111. The received low frequency signal 301 is driven through switching circuit 431 to line 407 towards a first input of a digitally tunable filter 408, which is in charge of selectively filtering the desired bandwidth of the low frequency signal (more details on an example of switch circuit 431 are provided in the following).

The desired bandwidth may correspond to the overall bandwidth 301, or to a portion of it, according to the specific frequency planning or scheduling policy (e.g., if OFDM is employed by the high frequency standard).

For example, if time division duplexing (TDD) operating mode is selected, the overall bandwidth 301 may be assigned to HDL communication, while if frequency division duplexing (FDD) mode is prescribed, HDL and HUL communications are allocated over orthogonal spectral portions within bandwidth 301. Moreover, according to another example, HDL and HUL are allocated over overlapped spectral portions within the bandwidth 301 by adopting the echo cancelling duplex mode as a well known system employed here for the bidirectional conversion apparatus 104.

The bandwidth of tunable band-pass filter 408 is selected by a control unit 424 via bus line 432.

An output of filter 408 is connected to an input of an amplifier 425. An output of the amplifier 425 is connected to an input of an Amplitude and spectrum compensation circuit 409. Circuit 409 has the function of filtering the signal to shape the frequency response so as to accomplish one or both the following goals:

(i) compensating the transmission loss over low frequency medium 105 and reshaping the signal to its original (transmitted) waveform to improve correct decoding capability of the received data at remote high frequency user 101;

(ii) applying a spectral gain to the signal so as to guarantee that the power spectral density of the high frequency signal 302 at the output of the antenna device 109 is within the spectral mask imposed by the employed high frequency wireless protocol.

The Amplitude and spectrum compensation circuit 409 may be entirely digital, entirely analog or hybrid and to perform the above described function it can be provided with an analog-to-digital converter and a digital-to-analog converter.

According to the described embodiment, it may also comprise an automatic gain control (AGC) circuit for power gain adaptation and an analog or digital equalization filter which is in charge of shaping the frequency response according to the frequency response specified from the remote unit 106 through the control signal 304. Circuit 409 may comprise a memory that acts as buffer to delay the signals to adapt different timing constraints of HUL and HDL according to control signal over bus line 410.

Setting of amplitude and spectrum compensation circuit 409 is mandated by control unit 424 through a control signal over line 410. For example, if tunable voltage attenuators are employed, control signal over line 410 sets, among the other parameters, a suitable attenuation setting of the one or more digitally tunable attenuators. The control signal 410 may be in the form of an analog voltage or in the form of a multiple bit digital signal.

An output of the amplitude and spectrum compensation circuit 409 is connected to a first input of mixing circuit 439. A second input of mixing circuit 439 is connected to line 436. Mixing circuit 439 is in charge of up-converting the incoming low frequency signal 301 at frequency $f_L$ to appropriate frequency $f_H$, so as to obtain the high frequency signal 302. The frequency tone to be used for frequency conversion by mixing circuit 439 is generated by frequency synthesizer 416 and delivered to the mixing circuit 439 through connection 436. Output frequency tones from frequency synthesizer 416 are selected according to a control signal from control unit 424 via bus line 419. Alternatively, the order of the mixer 439 and the amplitude and spectrum compensation circuit 409 may be reversed without affecting operation of the bidirectional apparatus. The type of device referred to as mixing circuit 439 can be composed of a proper tunable band-pass filter and a mixer, or a sequence of proper tunable band-pass filters and mixers.

The type of device selected as mixer can include any suitable single ended, balanced, double-balanced, double-double balanced or other mixer. Alternatively, it is well-known in-the-art of up-conversion that multiple mixing circuits as 439 and filter 420 can be connected in sequence to replace the one-stage mixer 439 with multiple stage up-conversion. In this case, each of the mixing receives the appropriate frequency over lines 436 from unit 416, and amplitude and spectrum compensation circuit 409 can be interleaved in any position within the up-conversion chain without affecting operation. Mixing circuit 439 may also be controlled by the control unit 424 through a control signal over line 418 that is functional to mandate appropriate control information to the mixing circuit 439, such as the setting of the selective bandwidth of the at least one band-pass filter included in the mixing circuit 439.

An output of the mixing circuit 439 is fed into an input of a digitally tunable filter 420. Selective bandwidth of this filter is set by control unit 424 through line 435. One output of the digitally tunable filter 420 is connected to the amplifier 421. The amplifier 421 may comprise one main amplifier and one or multiple driver amplifiers, and may be realized according to one from the different techniques known in the art. The output of the amplifier 421 is connected to an input of switch circuit 401, which is in charge of delivering the high frequency signal 302 to the connection 113.

Figure 5:
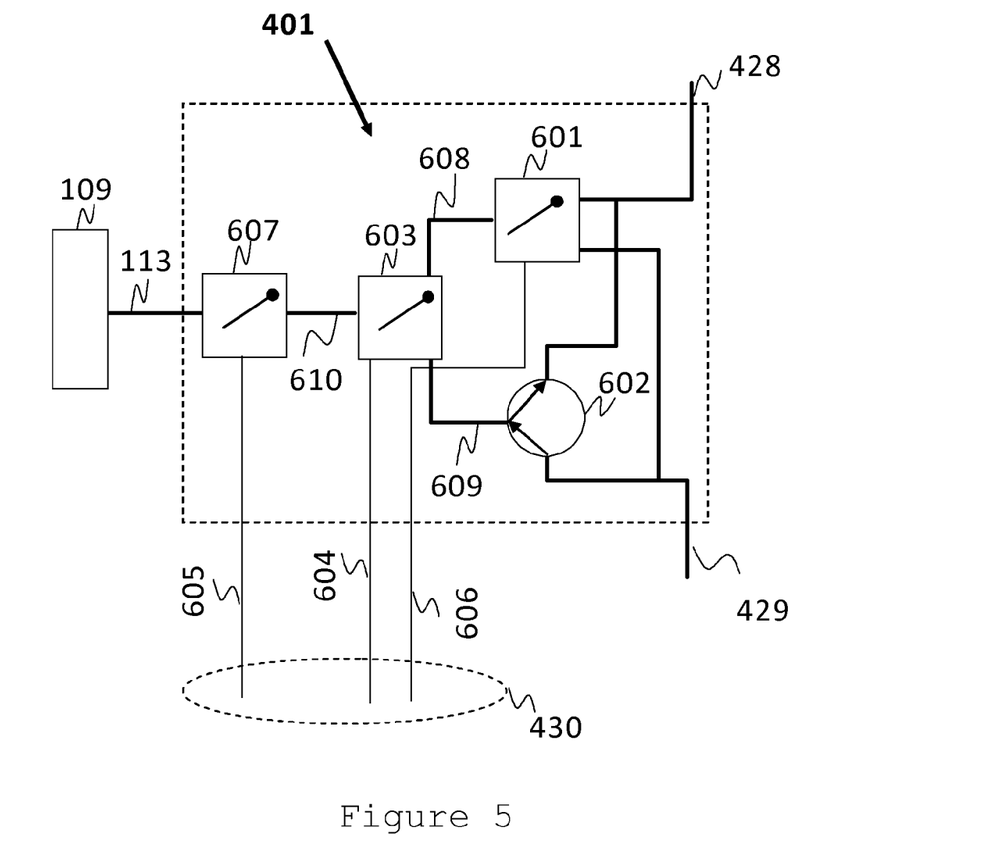
FIG. 5 schematically shows an embodiment of a first switch circuit employable by said bidirectional conversion apparatus.

One possible implementation of circuit 401 is in FIG. 5. HDL line 429 is connected to a first gate of switch 601, and to a first gate of a duplexer 602. HUL line 428 is connected to a second gate of switch 601 and to a second gate of duplexer 602. The functions of the duplexer 602 are to inject the high frequency HDL signal received over line 429 to bidirectional line 609 and, conversely, to inject the received high frequency HUL signal received over the bidirectional line 609 to line 428. Alternatively, the duplexer 602 may be replaced with a coupler, a hybrid tee, a circulator, or any other device providing high directivity between the ports used for HUL and HDL signals. Switch 601 is piloted by a common clock reference signal generated by the control unit 424 (FIG. 4), and is in charge of connecting either the HUL line 428 or the HDL line 429 to line 608.

A control signal may be supplied through bus line 606 to control switching circuit 601. Line 608 is bidirectional and connects duplex signal to a first gate of switch 603 that selects either TDD or FDD mode. A second gate of switch 603 is connected to the gate of duplexer 602. Switch 603 is piloted by control signal over bus line 604 and connects line 608 or 609 to line 610 if TDD or FDD mode is selected, respectively (according to signaling information from control unit 424). Line 610 is fed into one gate of switch 607. Switch 607 enables/disables connection of line 610 with connection 113, according to a control signal received by the control unit 424 via bus line 605.

If the TDD mode is selected the switch 603 connects line 608 to line 610 and the switching circuit 601 alternatively connects the HUL line 428 and the HDL line 429 to line 608 so as to perform the TDD mode switching. As an example, the switching circuit 601 experiences a switch period of 5 ms between HDL and HUL.

If the FDD mode is selected, the switching circuit 601 is disabled and the switch 603 connects bidirectional line 610 to line 609. According to the FDD mode, both uplink and downlink signals propagate on line 609, while on line 429 and on line 428 the downlink signal and the uplink signal separately propagate, respectively.

A description of the HUL path structure and operation of the bidirectional apparatus of FIG. 4 is provided in the paragraph below.

High Frequency UpLink (HUL) Path

In the HUL path, the high frequency signal 302 incoming from the high frequency user 101 via high frequency medium 103 is received by the antenna device 109, and fed by line 113 to one gate of switch circuit 401. Switch circuit 401 delivers the received high frequency signal 302 to line 428. Line 428 is connected to a first input of a tunable band-pass filter 403. The bandwidth of the tunable band-pass filter 403 is selected by the control unit 424 via bus line 435. One output of the tunable filter 403 is connected to a first input of an amplifier 402. One output of the amplifier 402 is connected to a first input of mixing circuit 426. A second input of mixing circuit 426 is connected to line 437. Mixing circuit 426 is in charge of down-converting the incoming high frequency signal 302 at frequency $f_H$ to appropriate frequency $f_L$, so as to obtain low frequency signal 301. The frequency tone to be used for frequency conversion by mixing circuit 426 is generated by the frequency synthesizer 416 and delivered to the mixing circuit 426 through connection 437. The type of device referred to as mixing circuit 426 can include a suitable tunable band-pass filter and a mixer. The type of device selected as mixer can include any suitable single ended, balanced, double-balanced, double-double balanced or other mixer. Mixing circuit 426 may also be controlled by the control unit 424 through a control signal over line 412 that is functional to mandate appropriate control information to the mixing circuit 426, such as the setting of the selective bandwidth of the at least one band-pass filter included in the mixing circuit 426.

An output of mixing circuit 426 is connected to an input of Amplitude and spectrum compensation circuit 433. Circuit 433 has the function of filtering the signal to shape the frequency response so as to accomplish the at least one of the following goals:

(i) compensating the transmission loss over high frequency medium 103 and reshaping the signal to its original (transmitted) waveform to improve correct decoding capability of the received data at remote unit 106;

(ii) applying a gain to the signal so as to guarantee that the power spectral density of the low frequency signal 301 at the output of interfacing unit 110 is within the spectral mask imposed by the regulatory issues related to the low frequency medium 105.

The amplitude and spectrum compensation circuit 433 may be entirely digital, entirely analog or hybrid and to perform the above described function it can be provided with an analog-to-digital converter and a digital-to-analog converter.

Optionally, circuit 433 may also apply some form of pre-equalization on low frequency signal 301 before transmission over low frequency medium 105. Considerations made for amplitude and spectrum compensation circuit 409 still holds for circuit 433. Setting of amplitude and spectrum compensation circuit 433 is mandated by control unit 424 through a control signal over line 441. The control signal 441 may be in the form of an analog voltage or in the form of a multiple bit digital signal. Circuit 433 may comprise a memory that acts as buffer to delay the signals to adapt different timing constraints of HUL and HDL according to control signal 441.

Alternatively, the order of the mixer 426 and the Amplitude and spectrum compensation circuit 433 may be reversed without affecting operation of bidirectional conversion apparatus 104. Similarly to up-conversion, the down-conversion mixer 426 can be replaced by a cascade of multiple mixing circuits as 426 connected in sequence to replace the one-stage mixer 426 with multiple stage down-conversion. In this case, each of the mixer receives the appropriate frequency over lines 437 from unit 416, and the Amplitude and spectrum compensation circuit 433 can be interleaved in any convenient position within the down-conversion chain without affecting operation.

An output of circuit 433 is connected to an input of the tunable band-pass filter 405, whose bandwidth is tuned according to control signal carried over line 432. An output of tunable filter 405 is connected to an input of amplifier 440. An output of amplifier 440 is connected to a gate of switch circuit 431.

Figure 6:
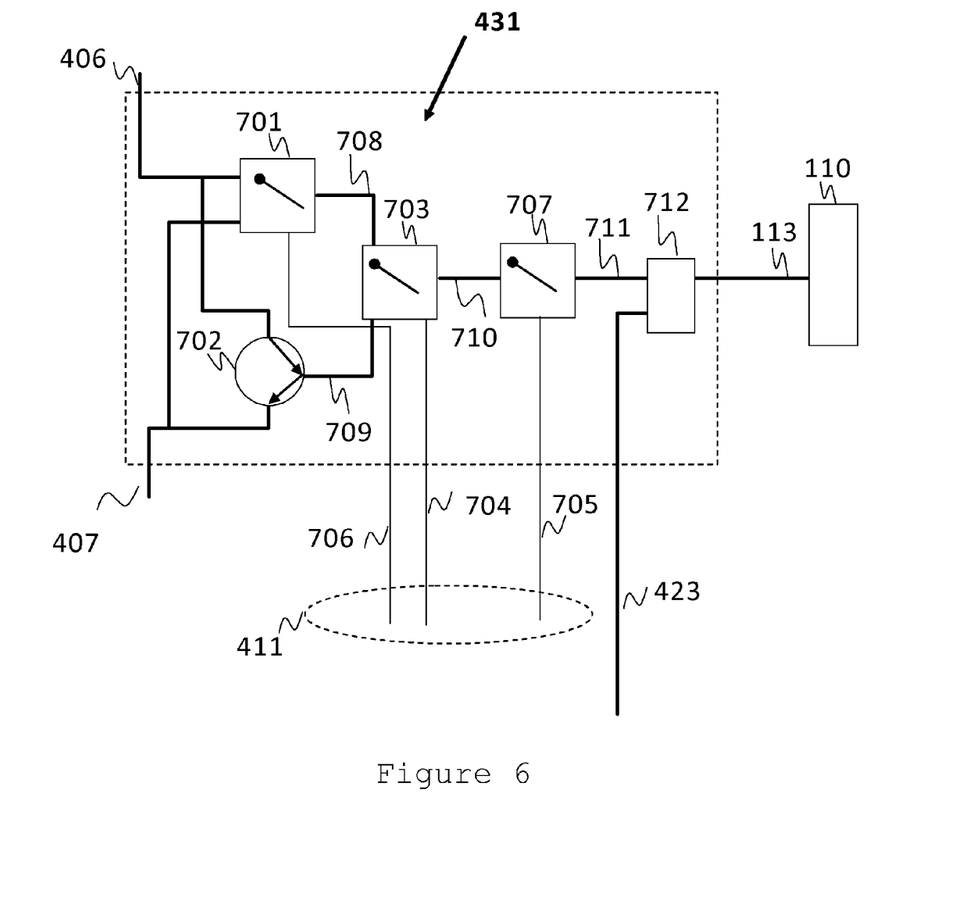
FIG. 6 schematically shows an embodiment of a second switch circuit employable by said bidirectional conversion apparatus.

One possible implementation of circuit 431 is in FIG. 6. HUL line 406 is connected to a first gate of switch 701, and to a first gate of a duplexer 702. HDL line 407 is connected to a second gate of switch 701 and to a second gate of duplexer 702. The functions of the duplexer 702 are to inject the low frequency HUL signal received over line 406 to bidirectional line 709 and, conversely, to inject the received low frequency HDL signal received over the bidirectional line 709 to HDL line 407. Alternatively, the duplexer 702 may be replaced with a coupler, a hybrid tee, a circulator, or any other device providing high directivity between the ports used for HUL and HDL signals.

Switch 701 is piloted by a common clock reference signal generated by the control unit 424 (FIG. 4), and is in charge of connecting either the HUL line 406 or the HDL line 407 to line 708, according to the TDD prescriptions. A control signal may be supplied through bus line 706 to control switching circuit 701. Line 708 is bidirectional and connects duplex signal to a first gate of switch 703 that selects either TDD or FDD mode.

A second gate of switch 703 is connected to the gate of duplexer 702. Switch 703 is piloted by control signal over bus line 704 and connects line 708 or 709 to line 710 if TDD or FDD mode is selected, respectively (according to signaling information from control unit 424). Line 710 is fed into one gate of switch 707. Switch 707 enables/disables connection of line 710 with connection 711, according to a control signal received by the control unit 424 via bus line 705. Line 711 is connected to a gate of a hybrid circuit 712.

A second gate of hybrid circuit 712 is connected to line 423. Hybrid circuit 712 is also connected to bidirectional line 113, and is in charge of coupling signals over lines 711 and 423 towards line 113.

If the TDD mode is selected the switch 703 connects line 708 to line 710 and the switching circuit 701 alternatively connects the HUL line 406 and the HDL line 407 to line 708 so as to perform the TDD mode switching. As an example, the switching circuit 701 experiences a switch period of 5 ms between HDL and HUL.

If the FDD mode is selected, the switching circuit 701 is disabled and the switch 703 connects bidirectional line 710 to line 709. According to the FDD mode, both uplink and downlink signals propagate on line 709, while on line 407 and on line 406 the downlink signal and the uplink signal separately propagate, respectively.

It is also observed that circuit 433 may include an echo canceller module (not shown in the figures as known art) which can be alternatively placed in another position to operate on both uplink and downlink paths.

It is here remarked that bidirectional conversion apparatus 104 could be provided with a circuit (not shown in the figures as it is known to those skilled in the art) adapted to supply power to the bidirectional unit 104 itself by using power drawn from the remote unit 106. As an example, this circuit can be placed into block 712.

Control and Synchronization

Remote unit 106 sets the operating features of the bidirectional conversion apparatus 104 through a control channel contained in control bandwidth 304 shown, as an example, in FIG. 3. Low frequency signal at the output of Amplitude and spectrum compensation circuit 409 is spilled and delivered to the control unit 424 via line 414. After analog-to-digital conversion, control signal 304 is selected and elaborated by the control unit 424, so as to retrieve signaling control information A1-A4.

Control unit 424 uses signalling information A3 for appropriate piloting of the aforementioned switch circuits 401 and 403 so as to set the bidirectional conversion apparatus 104 to operate according to the required duplexing mode at both the high frequency (over medium 103) and low frequency (over medium 105) interfaces.

Control unit 424 can also detect activity of DSL modem 422 through bus line 434.

Signaling information A4 is utilized by control unit 424 to tune the bandwidth of all the band-pass filters 403, 405 and 408, 420 both in the HDL and in the HUL path. If apparatus 104 is required to operate over 103 in time division duplexing (TDD), tunable filters 403 and 420 in both the HUL and HDL chain are tuned so as to have the same bandpass response, while if frequency division duplexing (FDD) over 103 is prescribed, filters 403 and 420 are tuned so as to have orthogonal frequency responses.

If the bidirectional conversion apparatus 104 is required to operate over the electrical conductor based transmission line 105 in time division duplexing (TDD), tunable filters 405 and 408 in both HUL and HDL are tuned so as to have the same bandpass response, while if frequency division duplexing (FDD) over the transmission line 105 is prescribed, filters 405 and 408 are tuned so as to have different frequency responses. The duplex mode of high frequency link over the connection 103 and low frequency link over transmission line 105 are both the same (TDD/TDD or FDD/FDD) or can be changed (TDD to FDD or FDD to TDD) by storing the digital version of the signals on a temporary memory in 409 and 433 that delays signals to adapt the frame structure of the duplex modes.

A suitable setting for both the Amplitude and spectrum compensation circuits 409 and 433 is mandated by control unit 424 via bus lines 410 and 441, respectively, by exploiting signaling information A1-A2, and the estimation of the average power spectral density of both HUL and HDL signals. More specifically, referring back to FIG. 4, control unit 424 utilizes multiple time-samples obtained after analog-to-digital conversion of the low frequency signal on line 414 to estimate the average power spectral density of the HDL signal. In general, control unit 424 is operative to determine whether the estimated power spectral density of the HDL signal keeps below/above the predefined spectrum mask acquired via control channel 304 (A1), and, if so, establishes a control signal at an output 410 to appropriately adjust the frequency response of the Amplitude and spectrum compensation circuit 409. This process may be also repetitively executed by control unit 424 so as to adaptively track possible variations in the average strength of the low frequency signal at the output of Amplitude and spectrum compensation circuit 409.

The same concept applies in HUL from the analog-to-digital conversion of the low frequency signal on line 415 to estimate the average power spectral density of the HUL signal to adapt the corresponding amplitude and spectrum compensation circuit 433 via control signalling over bus line 441. Specifically, HUL low frequency signal carried over line 404 is spilled and delivered to the control unit 424 via line 415. Control unit 424 executes an analog-to-digital conversion of the signal over input line 415, and utilizes the multiple time-samples to obtain an estimate of the average power spectral density of the HUL signal over line 404. In general, control unit 424 is operative to determine whether the estimated power spectral density keeps below/above a predefined spectrum mask acquired via control channel 304 (A2), and, if so, establishes a control signal at an output 441 to appropriately adjust the gain of circuit 433. This process may be also repetitively executed by control unit 424 so as to adaptively track possible variations in the average strength of the low frequency signal at the output of circuit 433.

Moreover, remote unit 106 distributes a highly stable reference tone 303 (FIG. 3) through low-frequency medium 105. This signal is filtered by band-pass filter 438 and then delivered to the frequency synthesizer 416 for generating the frequency tones for mixing circuits 426 and 439. Frequency synthesizing relies on phase-locking circuits and is accomplished according to standard methods already well investigated in the art.

The equipment 1000 in FIG. 2 can be employed in femtocell scenarios, by replacing the conventional in-house femtocell access point (FIG. 1) with the described bidirectional conversion apparatus 104, while deferring processing and network management functionalities of the femtocell access point to the remote unit 106. Remote unit 106 can be located, as an example, at a Telephone Company Central Office, and is connected to the bidirectional device 104 and, particularly, to further bidirectional apparatuses (analogous to the apparatus 104) through the available electrical conductor based transmission line 105 (e.g., twisted pair telephone line).

The bidirectional conversion apparatus 104 adapts the specifications of the radio frequency (RF) spectrum and power of the high frequency signal incoming from the high frequency user 101 over medium 103 to the specifications of the low frequency spectrum and power on the transmission line 105, and vice-versa.

Relevant advantages arise from this envisioned architecture with respect to the canonical femtocell deployment (as in FIG. 1), among which:

(i) multiple terminals as the high frequency user 101 are synchronized to the same frequency and frame structure of the remote unit 106; the remote base apparatus 106 can thus coordinate the transmissions and receptions of a group of bidirectional conversion apparatuses 104 to efficiently exploit the benefits of centralized interference mitigation in the uplink (HUL) and joint radio resource management in the downlink (HDL), by emulating a virtual Multiple-Input-Multiple-Output (MIMO) system. This allows to reduce interferential effect among the plurality of signals occurring between several users 101 and the remote base apparatus 106.

This is known to increase the throughput (or spectral efficiency) for both HDL and HUL paths. Particularly, MIMO processing can be adapted to handle the cascade of the air and cable channels, by exploiting the different time-varying rate of both of them. This is a crucial advantage with respect to the conventional femtocell architecture (FIG. 1), where all the access points serving different femtocells are treated as uncoordinated entities, and no centralized interference management policies are possible.

(ii) system operating expense (OPEX) is reduced through the avoidance in deployment of any network element as home-device and centralization of the processing by one remote base apparatus 106 serving multiple conversion apparatuses 104.

(iii) opening of new scenarios pursuing a centralized control of seamless wireless connectivity by the remote base apparatus 106.

(iv) the bidirectional conversion apparatus 104 is not excessively complex and is robust and cheap (due to reduced bill of materials with respect to the conventional femtocell access point) and needs no maintenance;

(v) the low cost of the bidirectional conversion apparatus 104 can also promote the employment of open access paradigm for femtocells, with notable advantages in terms of throughput (or spectral efficiency); operators can thus provide the users with the full nomadicity by leveraging on the paradigm always-connected over different services.

(vi) the bidirectional conversion apparatus 104 can be realized to be a flexible apparatus as it is not tailored to any specific wireless standard but rather to the transmission connection to/from the house; flexibility of many bidirectional conversion apparatus 104 deployed in every house controlled by the same remote unit 106 can open scenarios where each femtocell can be reconfigured as multistandard cellular (WiMAX and/or LTE) or as WiFi-hotspot according to the remote radio resource management (RRM) unit (at the remote unit 106).

The invention claimed is:

1. A femtocell telecommunication system equipment comprising: a base apparatus structured to perform modulation/demodulation, coding/decoding and to provide a first information signal and control signals; an electrical conductor based transmission line connected to said base apparatus; and a bidirectional conversion apparatus configured to receive from the electrical conductor based transmission line and to transmit on the electrical conductor based transmission line the first information signal and the control signals; the bidirectional conversion apparatus being external and remotely located with respect to the base apparatus and including: a tunable processing module structured to perform frequency translation and power shaping of the first information signal to obtain a second information signal and vice-versa; the second information signal being configured to be transmitted and received by an antenna device connectable to the bidirectional conversion apparatus; the second information signal having a frequency allocation higher than a first frequency allocation of the first information signal, and a bandwidth equal to a first bandwidth of the with respect to the first information signal; and a control unit configured to receive the control signals from said remote base apparatus on said electrical conductor based transmission line and send to the tunable processing module corresponding configuration signals setting operating behaviour of the tunable processing module.

2. The femtocell telecommunication system equipment according to claim 1, wherein the electrical conductor based transmission line includes at least one of the following lines selected from the group consisting of a: twisted pair telephone line, coaxial cable, and transmission line employing power line.

3. The femtocell telecommunication system equipment according to claim 1, wherein: the tunable processing module comprises a frequency conversion module configured to perform a bandwidth conversion from the first information signal to the second information signal and vice-versa based on at least one synchronization reference signal; the control unit being configured to provide said at least one synchronization reference signal obtained from the control signals.

4. The femtocell telecommunication system equipment according to claim 2, wherein the tunable processing module is structured to selectively assume one operating mode belonging to the following group of operating modes: time division duplex, TDD, operating mode frequency division duplex, FDD, operating mode and echo cancelling duplex operating mode; the tunable processing module is configurable to operate according to a first operating mode of said group of operating modes to process the first information signal and to a second operating mode of said group of operating modes, different from the first operating mode, to process the second information signal; the tunable processing module is configurable by configuration signals comprising first setting signals to perform switching of the processing module from operating modes of said group of operating modes and to set operating parameters of each operating mode of the group of operating modes.

5. The femtocell telecommunication system equipment according to claim 1, wherein the tunable processing module further comprises a power spectral shaping processing module and wherein the configuration signal comprises a second setting signal to set the parameters of the power spectral shaping processing module.

6. The femtocell telecommunication system equipment according to claim 3, wherein the frequency conversion module comprises:
- a frequency synthesizer for receiving at least one synchronization reference signal and generating first and second local tones;
- a first mixing circuit based on said first local tone to perform a bandwidth up-conversion of the first information signal towards the second information signal;
- a second mixing circuit based on the second local tone to perform a bandwidth down-conversion of the second information signal towards the first information signal.

7. The femtocell telecommunication system equipment according to claim 4, wherein the tunable processing module includes:
- at least one first tunable band-pass filter associated with an uplink communication; and
- at least one second tunable band-pass filter associated with a downlink communication;
- wherein said first setting signals are configured to adjust the at least one first tunable band-pass filter and the at least one second tunable band-pass filter.

8. The femtocell telecommunication system equipment according to claim 5, wherein said power spectral shaping processing module comprises:
- a first power spectral module structured to compensate amplitude attenuation and/or spectral distortion to provide a compensated signal starting that is used to obtain the second signal compatible to be transmitted by the antenna device;
- a second power spectral module structured to compensate amplitude attenuation and/or spectral distortion to provide a further compensated signal starting that is used to obtain the first information signal spectrally compatible to be transmitted towards the electrical conductor based transmission line.

9. The femtocell telecommunication system equipment according to claim 8, wherein said power spectral processing module comprises: an analog-to-digital converter, a digital filter, and a digital-to-analog converter, and wherein said second setting signals are configured to configure coefficients defining the digital filter.

10. The femtocell telecommunication system equipment according to claim 9, wherein said power spectral processing module comprises a memory for digital signals,
and wherein said second setting signals are adjusted to compensate for delays of timing from the digital-to-analog converter.

11. The femtocell telecommunication system equipment according to claim 1, wherein the base apparatus is structured to provide a further first information signal and further control signals; and wherein the equipment also includes: a further electrical conductor based transmission line connected to said base apparatus; a further bidirectional conversion apparatus configured to receive/transmit from/on the further electrical conductor based transmission line the further first information signal; the further bidirectional conversion apparatus being external and remotely located with respect the base apparatus; the further bidirectional conversion apparatus being independently operated from said bidirectional conversion apparatus.

12. The femtocell telecommunication system equipment according to claim 11, wherein the further bidirectional conversion apparatus includes: a further tunable processing module structured to perform frequency translation and power shaping of the further first information signal to obtain a further second information signal and vice-versa; the further second information signal being configured to be transmitted and received by a further antenna device connectable to the further bidirectional conversion apparatus; the further second information signal having: second frequency allocation higher than a further first frequency allocation of the further first information signal; and a second bandwidth equal to a further first bandwidth of the further first information signal; a further control unit adapted to receive the further control signals from said remote base apparatus on the said further transmission line and send to the further tunable processing module corresponding further configuration signals setting operating behaviour of the further tunable processing module.

13. The femtocell telecommunication system equipment according to claim 1, wherein the tunable processing module is structured to selectively assume one operating mode belonging to the following group of operating modes: time division duplex, TDD, operating mode frequency division duplex, FDD, operating mode and echo cancelling duplex operating mode; the tunable processing module is configurable to operate according to a first operating mode of said group of operating modes to process the first information signal and to a second operating mode of said group of operating modes, different from the first operating mode, to process the second information signal; the tunable processing module is configurable by configuration signals comprising first setting signals to perform switching of the processing module from operating modes of said group of operating modes and to set operating parameters of each operating mode of the group of operating modes.

14. The equipment according to claim 3, wherein the tunable processing module is structured to selectively assume one operating mode belonging to the following group of operating modes: time division duplex, TDD, operating mode frequency division duplex, FDD, operating mode and echo cancelling duplex operating mode; the tunable processing module is configurable to operate according to a first operating mode of said group of operating modes to process the first information signal and to a second operating mode of said group of operating modes, different from the first operating mode, to process the second information signal; the tunable processing module is configurable by configuration signals comprising first setting signals to perform switching of the processing module from operating modes of said group of operating modes and to set operating parameters of each operating mode of the group of operating modes.

15. The femtocell telecommunication system equipment according to claim 2, wherein the tunable processing module further comprises a power spectral shaping processing module and wherein the configuration signal comprises a second setting signal to set the parameters of the power spectral shaping processing module.

16. The femtocell telecommunication system equipment according to claim 3, wherein the tunable processing module further comprises a power spectral shaping processing module and wherein the configuration signal comprises a second setting signal to set the parameters of the power spectral shaping processing module.

17. The femtocell telecommunication system equipment according to claim 4, wherein the tunable processing module further comprises a power spectral shaping processing module and wherein the configuration signal comprises a second setting signal to set the parameters of the power spectral shaping processing module.

18. The femtocell telecommunication system equipment according to claim 1, wherein said power spectral processing module comprises: an analog-to-digital converter, a digital filter, and a digital-to-analog converter, and wherein said second setting signals are configured to configure coefficients defining the digital filter.

19. The femtocell telecommunication system equipment according to claim 2, wherein said power spectral processing module comprises: an analog-to-digital converter, a digital filter, and a digital-to-analog converter, and wherein said second setting signals are configured to configure coefficients defining the digital filter.

20. The femtocell telecommunication system equipment according to claim 3, wherein said power spectral processing module comprises: an analog-to-digital converter, a digital filter, and a digital-to-analog converter, and wherein said second setting signals are configured to configure coefficients defining the digital filter.

\* \* \* \* \*

UNITED STATES PATENT AND TRADEMARK OFFICE
CERTIFICATE OF CORRECTION

PATENT NO. : 9,107,203 B2  
APPLICATION NO. : 13/581047  
DATED : August 11, 2015  
INVENTOR(S) : Spagnolini et al.

Page 1 of 1

It is certified that error appears in the above-identified patent and that said Letters Patent is hereby corrected as shown below:

IN THE DRAWINGS

In Fig. 1, Sheet 1 of 4, delete "Network Trasport" and insert -- Network Transport --, therefor.

IN THE SPECIFICATION

In Column 3, Line 26, delete "101 e" and insert -- 101 --, therefor.

In Column 5, Line 2, delete "SDLS," and insert -- SDSL, --, therefor.

In Column 12, Line 10, delete "maintenance;" and insert -- maintenance. --, therefor.

IN THE CLAIMS

In Column 14, Line 56, in Claim 14, delete "equipment" and
insert -- femtocell telecommunication system equipment --, therefor.

Signed and Sealed this  
Sixteenth Day of February, 2016

Michelle K. Lee  
*Director of the United States Patent and Trademark Office*